(12) United States Patent
Yoshitsune et al.

(10) Patent No.: US 8,136,819 B2
(45) Date of Patent: Mar. 20, 2012

(54) SEALING STRUCTURE AND GASKET

(75) Inventors: Shuji Yoshitsune, Nihonmatsu (JP); Kiyohiro Suzuki, Fujisawa (JP); Manshu Kameike, Fujisawa (JP); Seiji Tani, Tokyo (JP); Hideki Tanaka, Tokyo (JP); Shin Yoshida, Tokyo (JP); Masanori Sudo, Tokyo (JP)

(73) Assignees: Nok Corporation, Tokyo (JP); MAHLE Filter Systems Japan Corporation, Tokyo (JP)

( * ) Notice: Subject to any disclaimer, the term of this patent is extended or adjusted under 35 U.S.C. 154(b) by 343 days.

(21) Appl. No.: 12/532,943

(22) PCT Filed: Mar. 12, 2008

(86) PCT No.: PCT/JP2008/054491
§ 371 (c)(1),
(2), (4) Date: Nov. 10, 2009

(87) PCT Pub. No.: WO2008/126597
PCT Pub. Date: Oct. 23, 2008

(65) Prior Publication Data
US 2010/0102519 A1    Apr. 29, 2010

(30) Foreign Application Priority Data

Mar. 30, 2007   (JP) ................................ 2007-094691

(51) Int. Cl.
*F16J 15/02* (2006.01)
(52) U.S. Cl. .......................................... 277/630; 277/637
(58) Field of Classification Search .................. 277/598, 277/628, 630, 637, 640, 642, 641, 644
See application file for complete search history.

(56) References Cited

U.S. PATENT DOCUMENTS

| 2,210,183 | A  | * | 8/1940 | Schweighart | 206/557 |
| 4,846,482 | A  | * | 7/1989 | Blodgett et al. | 277/591 |
| 7,004,477 | B2 | * | 2/2006 | Sakata et al. | 277/612 |
| 7,287,758 | B2 | * | 10/2007 | Sandford | 277/598 |
| 7,815,198 | B2 | * | 10/2010 | Tani | 277/644 |
| 7,938,406 | B2 | * | 5/2011 | Matsumoto et al. | 277/637 |
| 2004/0036232 | A1 | * | 2/2004 | Fluck et al. | 277/641 |
| 2006/0290075 | A1 | * | 12/2006 | Tani | 277/628 |

(Continued)

FOREIGN PATENT DOCUMENTS

JP    4-74771    6/1992

(Continued)

*Primary Examiner* — Thomas Beach
*Assistant Examiner* — Nicholas L Foster
(74) *Attorney, Agent, or Firm* — Harness, Dickey & Pierce, P.L.C.

(57) ABSTRACT

There is provided a sealing structure and a gasket which can seal both of a portion where a groove for mounting the gasket is formed and a portion where a groove for mounting the gasket is not formed when the portions are connected.
The gasket includes a first gasket portion 110 which has a first mounted portion 111 to be mounted in a first groove 211 to come in close contact with a bottom face 211a of the first groove 211 and which is formed in a shape along an end portion of an outer wall portion 210 and a second gasket portion 120 which has a second mounted portion 150 to be mounted in a second groove 221 near a portion connected to the first gasket portion 110 and which is formed in a shape along an end portion 220 of a partition wall 220, the second mounted portion 150 having an inclined face for coming in close contact with the inclined bottom face 221a of the second groove 221.

10 Claims, 11 Drawing Sheets

U.S. PATENT DOCUMENTS

2008/0224421 A1* 9/2008 Niblett et al. ................ 277/638
2008/0315532 A1* 12/2008 Taniguchi ..................... 277/630

FOREIGN PATENT DOCUMENTS

| | | |
|---|---|---|
| JP | 04-074771 | 6/1992 |
| JP | 2548725 | 5/1997 |
| JP | 9-240539 | 9/1997 |
| JP | 10-061489 | 3/1998 |
| JP | 11-223118 | 8/1999 |
| JP | 2002-061539 | 2/2002 |
| JP | 2004-138196 | 5/2004 |
| JP | 2006-029364 | 2/2006 |

* cited by examiner

SEALING STRUCTURE AND GASKET

CROSS-REFERENCE TO RELATED APPLICATIONS

This application is a National Stage of International Application No. PCT/JP2008/054491, filed Mar. 12, 2008. The entire disclosure of the above application is incorporated herein by reference.

TECHNICAL FIELD

The present invention relates to a sealing structure and a gasket.

BACKGROUND ART

In a case of a gasket for sealing a space between surfaces of two members static with respect to each other, it is common practice to form a groove in one of the two members to mount the gasket in the groove in order to prevent displacement of the gasket.

In some cases, on the other hand, because of dimensions or a quality problem caused in molding, it is difficult to form the groove for mounting the gasket in a portion where the gasket is to be mounted. In such cases, it is necessary to employ some structure for positioning the gasket.

In some cases, a portion where a groove for mounting the gasket can be formed and a portion where a groove for mounting the gasket cannot be formed are connected. In such cases, it is conceivable to separately provide a special gasket for the portion where the groove is formed and a special gasket for the portion where the groove is not formed.

However, if the respective gaskets are provided separately, it might be difficult to reliably seal junctions between the portions. Moreover, if the respective gaskets are provided separately, the number of parts increases and the number of operation steps for mounting the gasket increases as well.

Therefore, a gasket that can seal both the portion where the groove is formed and the portion where the groove is not formed is demanded. However, there is no known gasket that can appropriately seal both the portions when the portion where the groove for mounting the gasket is formed and the portion where the groove for mounting the gasket is not formed are connected.

Here, a description will be made of a specific example of a structure that can be adopted, that is, the structure in which the portion where the groove for mounting the gasket can be formed and the portion where the groove for mounting the gasket cannot be formed are connected to each other.

A gasket to be mounted between a cylinder head and a cylinder head cover of an engine of an automobile is mounted in a groove provided to the cylinder head cover, for example.

Because of a structure of the engine, various pipe portions and various connecting holes are provided in a space from an inside of the cylinder head to an inside of the cylinder head cover. As examples of the former, there are a pipe portion forming a flow path for blow-by gas, pipe portions forming flow paths for intaking and exhausting air, and intake and exhaust manifolds. As examples of the latter, there are a spark plug hole and bolt insertion holes.

Therefore, the gasket sometimes needs to be provided to a portion of the pipe portion or the connecting hole where the cylinder head and the cylinder head cover are joined to each other.

For a reason of layout, the pipe portion or the connecting hole may be provided to be adjacent to outer wall portions of the cylinder head and the cylinder head cover in some cases. It is difficult or not preferable to form a groove for mounting a gasket in a wall (partition) forming the pipe portion or the connecting hole in some cases. This is for a reason of space-saving layout or a molding quality reason in producing the cylinder head cover by resin molding.

In such cases, it is conceivable to employ the structure in which the portion (portion of the outer wall) where the groove for mounting the gasket can be formed and the portion (portion of the wall forming the pipe portion or the connecting hole) where the groove for mounting the gasket cannot be formed are connected to each other.

If this structure is employed, from a viewpoint of mounting workability or the like, a gasket that can seal both the portions (a gasket for sealing the portion where it is mounted in the groove and a gasket for sealing the portion where it is not mounted in the groove integrated into one gasket) is demanded. However, it is especially difficult to reliably seal the junction between both the portions and therefore there is no known gasket for appropriately sealing both the portions.

As examples of a structure to which the structure, in which the portion where the groove for mounting the gasket can be formed and the portion where the groove for mounting the gasket cannot be formed are connected to each other, can be applied, there are structures disclosed in Patent Documents 1 to 5.

Patent Document 1: Japanese Patent Application Laid-Open No. 11-223118
Patent Document 2: Japanese Patent Application Laid-Open No. 2006-29364
Patent Document 3: Japanese Patent Application Laid-Open No. 2004-138196
Patent Document 4: Japanese Utility Model No. 2548725
Patent Document 5: Japanese Patent Application Laid-Open No. 2002-61539

DISCLOSURE OF THE INVENTION

Problem to be Solved by the Invention

It is an object of the present invention to provide a sealing structure and a gasket that can seal both of a portion where a groove for mounting the gasket is formed and a portion where a groove for mounting the gasket is not formed, when the portions are connected to each other.

Means for Solving the Problem

To solve the above problem, the present invention employs the following means.

In other words, a sealing structure according to the invention includes:

a first member including an inner space area partitioned with a partition wall and having a first opening portion formed by an end portion (an end portion on an opening portion side) of an outer wall portion and a second opening portion formed by part of the end portion of the outer wall portion and an end portion of the partition wall (an end portion on the opening portion side) and provided in an area of the first opening portion;

a second member having an opposed face facing the end portion of the outer wall portion and the end portion of the partition wall; and a gasket mounted along the end portion of the outer wall portion and the end portion of the partition wall to seal a clearance between the respective end portions of the outer wall portion and the partition wall and the opposed face of the second member, wherein a first groove provided along an opening end edge of the first opening portion is formed in the end portion of the outer wall portion, a second groove having an inclined bottom face extending from a bottom face of the first groove to a surface of the end portion of the partition wall is formed only at a portion of the end portion of the partition wall connected to the outer wall portion, and the gasket includes a first gasket portion which has a first mounted portion to be mounted in the first groove to come in close contact with the bottom face of the first groove and which is formed in a shape along the end portion of the outer wall portion and a second gasket portion which has a second mounted portion to be mounted in the second groove near a portion connected to the first gasket portion and which is formed in a shape along the end portion of the partition wall, the second mounted portion having an inclined face for coming in close contact with the inclined bottom face of the second groove.

A gasket according to the invention, which is sandwiched between a first member and a second member to seal a clearance between the first member and the second member, wherein the first member includes: an inner space area partitioned with a partition wall and has a first opening portion formed of an end portion of an outer wall portion and a second opening portion formed of part of the end portion of the outer wall portion and an end portion of the partition wall and provided in an area of the first opening portion, a first groove provided along an opening end edge of the first opening portion is formed in the end portion of the outer wall portion, a second groove having an inclined bottom face extending from a bottom face of the first groove to a surface of the end portion of the partition wall is formed only at a portion of the end portion of the partition wall connected to the outer wall portion;

a second member has an opposed face facing the end portion of the outer wall portion and the end portion of the partition wall, and the gasket includes a first gasket portion which has a first mounted portion to be mounted in the first groove to come in close contact with the bottom face of the first groove and which is formed in a shape along the end portion of the outer wall portion and a second gasket portion which has a second mounted portion to be mounted in the second groove near a portion connected to the first gasket portion and which is formed in a shape along the end portion of the partition wall, the second mounted portion having an inclined face for coming in close contact with the inclined bottom face of the second groove.

With the invention, the portion (outer wall portion) where the groove (first groove) is formed can be sealed with the first gasket portion and the portion (partition wall) where the groove is not formed can be sealed with the second gasket portion. The second gasket portion is positioned by mounting of the second mounted portion in the second groove, the second mounted portion provided near the portion connected to the first gasket portion. At the portion where the outer wall portion and the partition wall are connected, the second groove is formed only in the portion of the end portion of the partition wall connected to the outer wall portion. By mounting of the second mounted portion provided to the second gasket portion in the second groove, this portion is sealed. The bottom face of the second groove is formed of the inclined face extending from the bottom face of the first groove to the surface of the end portion of the partition wall. The second mounted portion is provided with the inclined face for coming in close contact with the bottom face of the second groove. Therefore, even at the portion where the outer wall portion and the partition wall are connected, it is possible to stably exert sealing performance.

Preferably, the second gasket portion has a positioning portion for coming in close contact with a side face of the partition wall to be positioned with respect to the partition wall.

In this way, it is possible to reliably prevent displacement of the second gasket portion.

Preferably, the second gasket portion has a seal protrusion for coming in close contact with the end portion of the partition wall along the end portion and a pair of seal protruding portions provided along both sides of the seal protrusion on an opposite face to the seal protrusion to come in close contact with the opposed face of the second member.

In this way, the second gasket portion is compressed in a three-point contact state at the seal protrusion and the pair of seal protruding portions on the opposite face. Therefore, it is possible to stabilize the mounted state of the second gasket portion while preventing excessive compression of the second gasket portion.

Preferably, the inclined face of the second mounted portion is set so that a compression rate becomes uniform throughout the second mounted portion when the second gasket portion is sandwiched between the first member and the second member and that, when the second mounted portion is mounted in the second groove of the first member and an external force due to the second member is not acting on the second mounted portion, the second mounted portion is in close contact on a side of the bottom face of the first groove and has a clearance gradually increasing toward the surface of the end portion of the partition wall.

In this way, the compression rate becomes uniform throughout the second mounted portion and it is possible to stably exert the sealing performance.

Preferably, a pair of first protruding portions for respectively coming in close contact with both side faces of the second groove is provided on both side faces of the second mounted portion.

In this way, it is possible to stabilize the mounted state of the second mounted portion in the second groove.

Preferably, a second protruding portion for coming in close contact with a side face of the first groove is provided in a position of a side face of the first mounted portion opposite to a portion connected to the second gasket portion.

As a result, it is possible to stabilize the mounted state of the second mounted portion in the second groove.

Preferably, each of the first gasket portion and the second gasket portion is provided with a pair of seal protruding portions for coming in close contact with the opposed face of the second member, the seal protruding portions are formed of a first seal protruding portion provided along the opening end edge of the first opening portion, a second seal protruding portion provided along the end edge of the first opening portion excluding an area of the second opening portion, and a third seal protruding portion provided along an opening end edge of the second opening portion, and the first seal protruding portion, the second seal protruding portion, and the third seal protruding portion are provided separately from each other without being connected to each other.

Because the first seal protruding portion, the second seal protruding portion, and the third seal protruding portion are not connected to each other, it is possible to suppress concentration of stress on particular portions.

The above respective structures can be combined with each other if they can.

Effect of the Invention

As described above, according to the invention, even if the portion where the groove for mounting the gasket is formed and the portion where the groove for mounting the gasket is not formed are connected, it is possible to appropriately seal both the portions.

Figure 1:
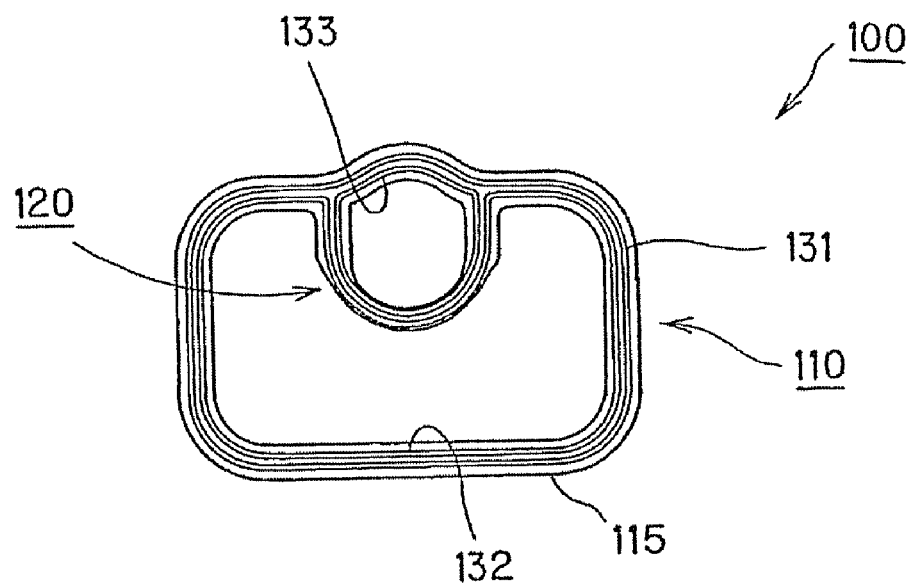
FIG. 1 is a plan view of a gasket according to an embodiment of the present invention.

EXPLANATION OF REFERENCE NUMERALS 100 gasket
110 first gasket portion
111 first mounted portion
115 jutting portion
120 second gasket portion
131 first seal protruding portion
132 second seal protruding portion
133 third seal protruding portion
131a, 132a, 133a, 134a seal protruding portion
140 protrusion
150 second mounted portion
151 first protruding portion
152 inclined face
152a inclined face
160 second protruding portion
161, 162 guide
161a, 162a corner portion
163 seal protrusion
200 cam cover
210 outer wall portion
211 first groove
211a bottom face
220 partition wall
221 second groove
221a bottom face
300 housing
301 opposed face
K1 first opening portion
K2 second opening portion

BEST MODE FOR CARRYING OUT THE INVENTION

With reference to the drawings, the best mode for carrying out the invention will be described below in detail in an illustrative manner based on an embodiment. However, dimensions, materials, shapes, relative positions, and the like of component parts described in the embodiment are not intended to restrict the scope of the invention unless there are special restrictive descriptions.

EMBODIMENT

With reference to FIGS. 1 to 16, a sealing structure and a gasket according to the embodiment of the invention will be described.

<General Structure of Gasket>

Figure 2:
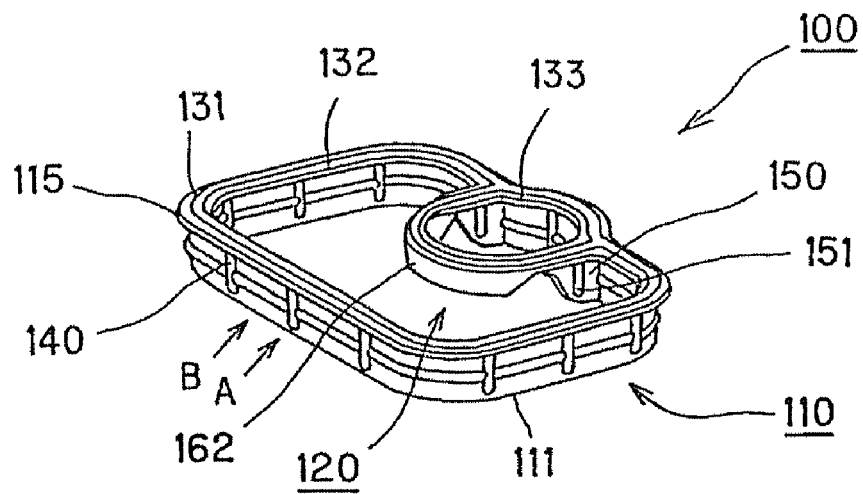
FIG. 2 is a perspective view of the gasket according to the embodiment of the invention viewed from above.
Figure 3:
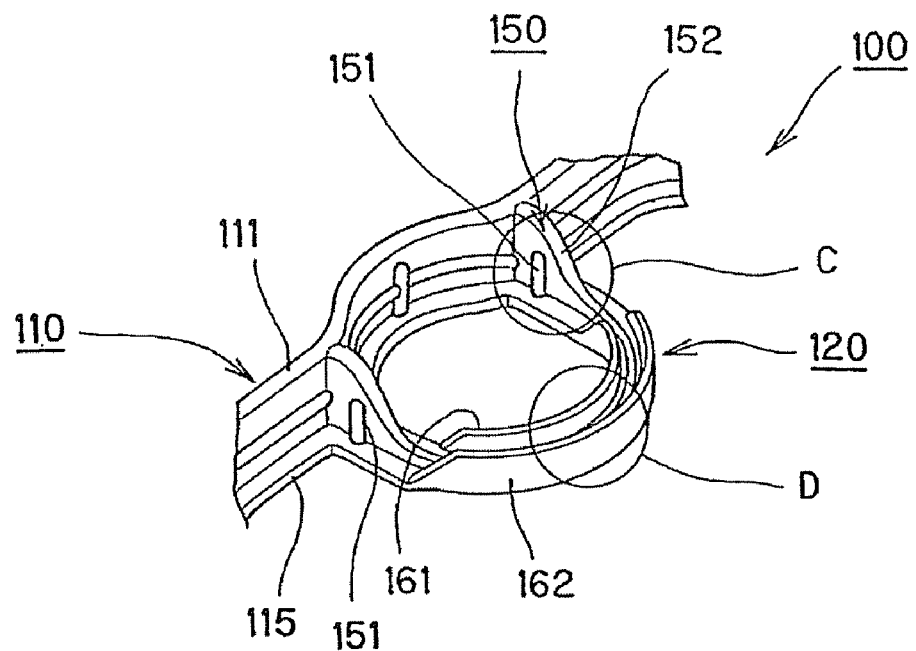
FIG. 3 is a part of a perspective view of the gasket according to the embodiment of the invention viewed from below.
Figure 4:
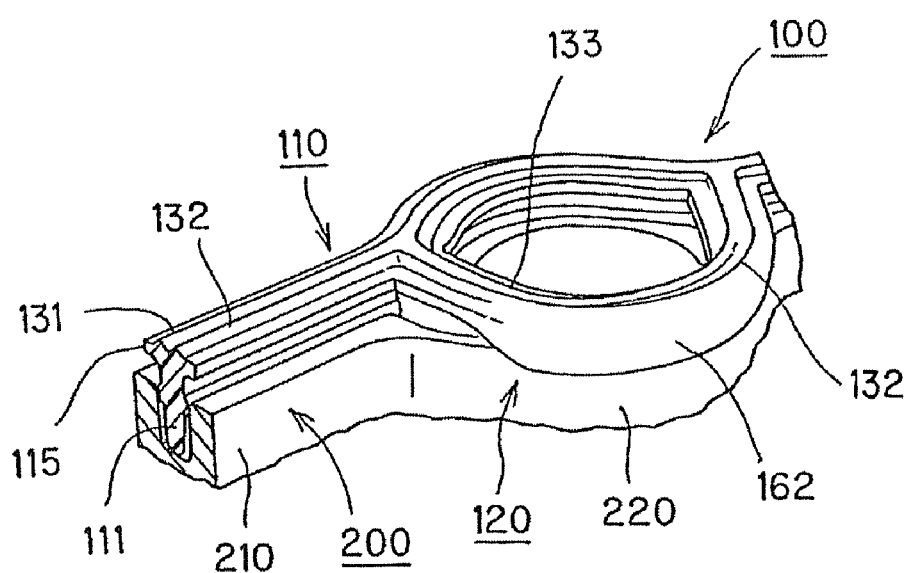
FIG. 4 is a part of a perspective view of a state of the gasket according to the embodiment of the invention mounted on a first member (cam cover) and viewed from above.
Figure 5:
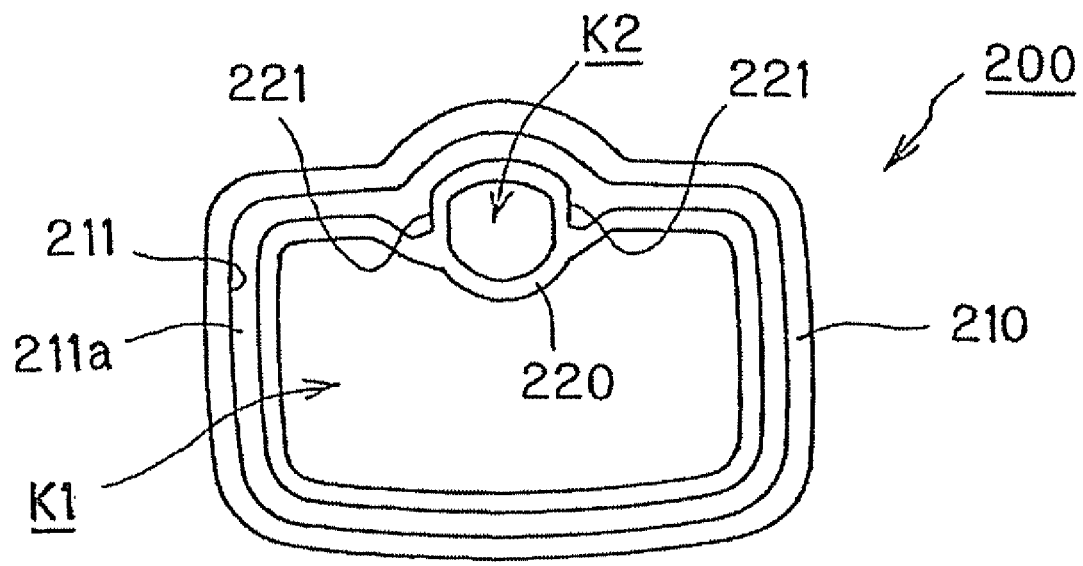
FIG. 5 is a schematic plan view of the first member (cam cover) according to the embodiment of the invention.
Figure 6:
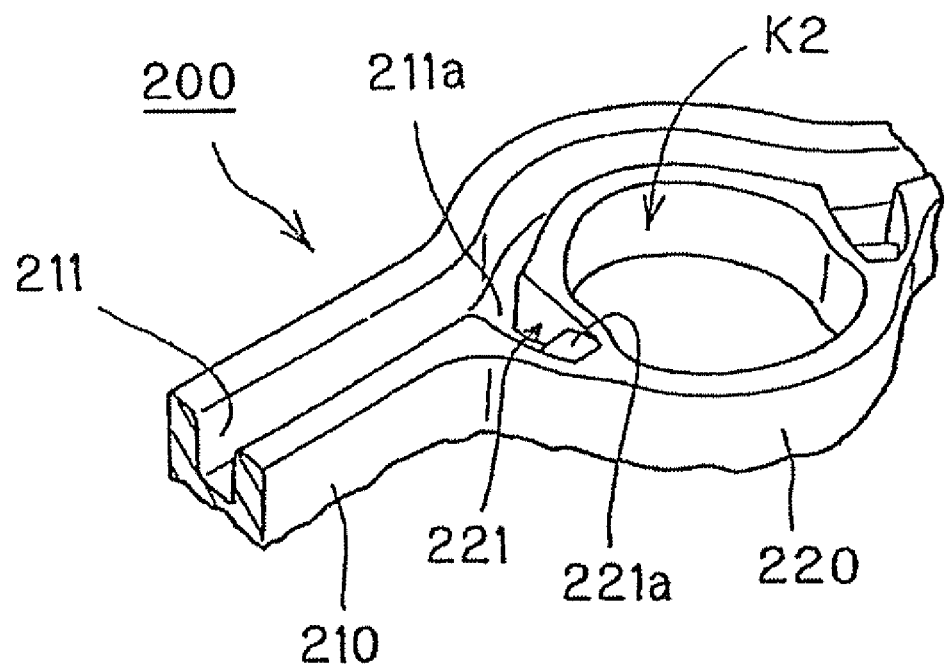
FIG. 6 is a part of a perspective view of the first member (cam cover) according to the embodiment of the invention.
Figure 7:
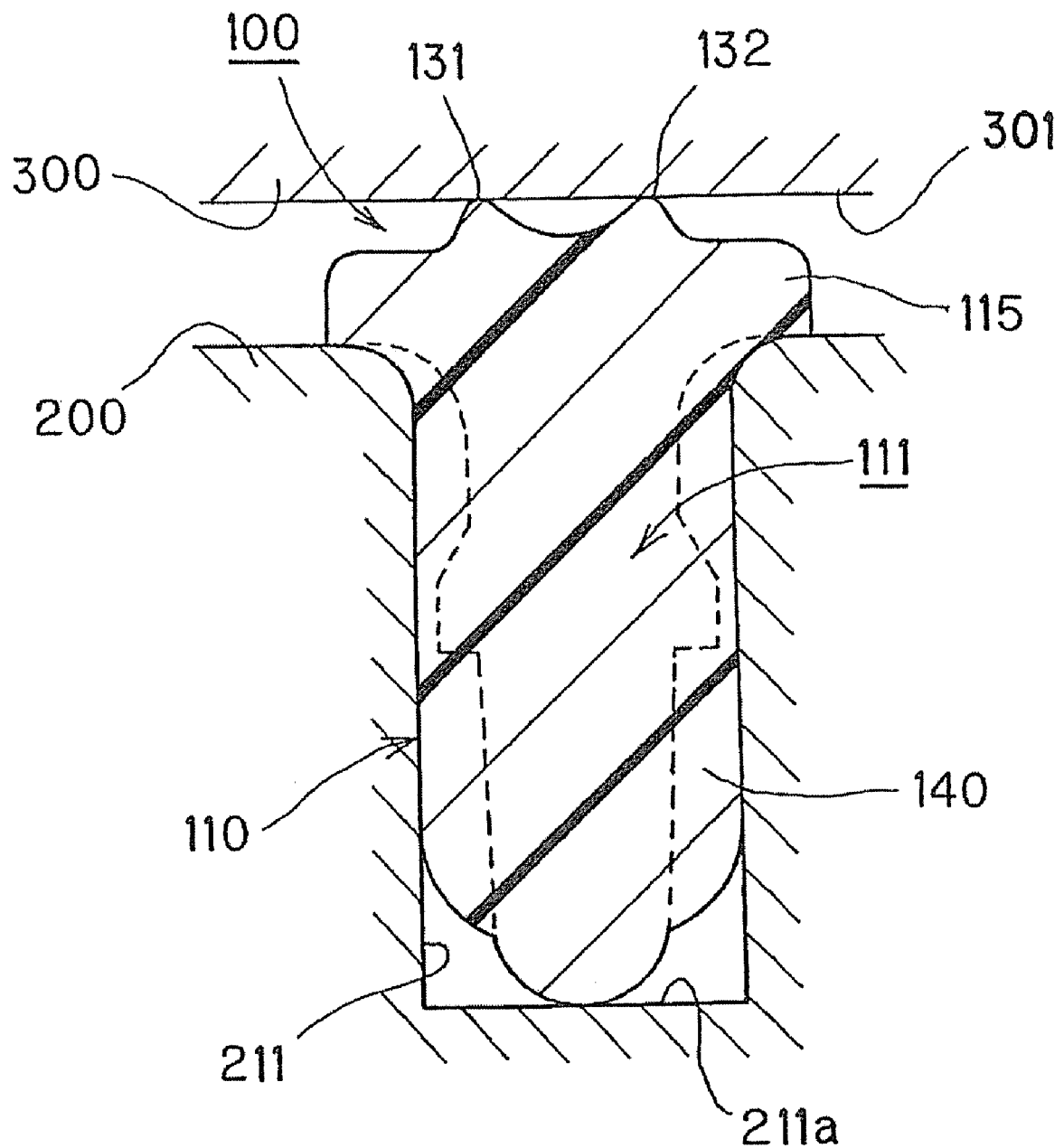
FIG. 7 is a schematic sectional view of a mounted state of a first gasket portion of the gasket according to the embodiment of the invention.
Figure 8:
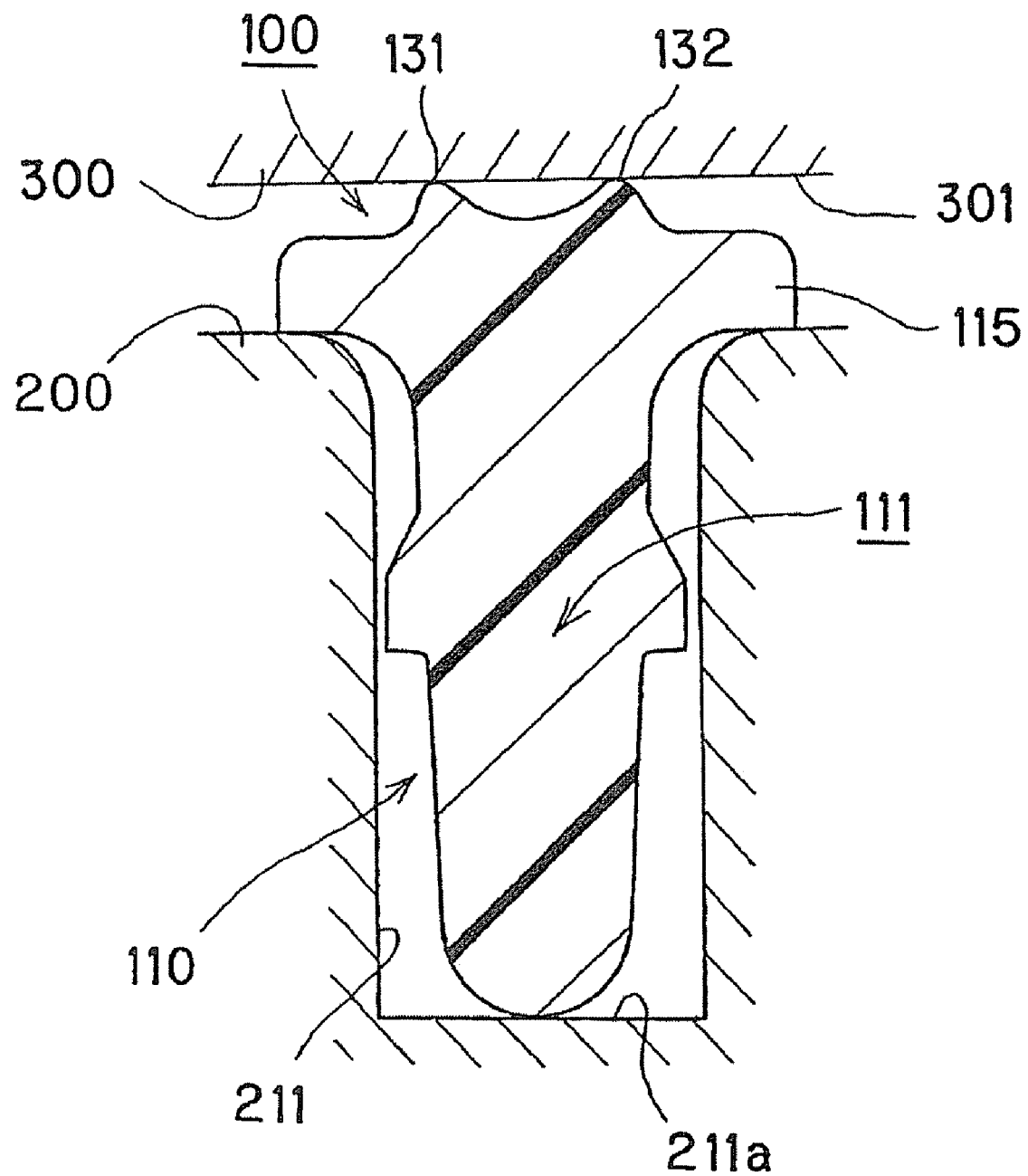
FIG. 8 is a schematic sectional view of the mounted state of the first gasket portion of the gasket according to the embodiment of the invention.

With reference to FIGS. 1 to 8, a general structure of the gasket according to the embodiment of the invention will be described. FIG. 1 is a plan view of the gasket according to the embodiment of the invention. FIG. 2 is a perspective view of the gasket according to the embodiment of the invention viewed from above. FIG. 3 is a part of a perspective view of the gasket according to the embodiment of the invention viewed from below. FIG. 4 is a part of a perspective view of a state of the gasket according to the embodiment of the invention mounted on a first member (cam cover) and viewed from above. FIG. 5 is a schematic plan view of the first member (cam cover) according to the embodiment of the invention. FIG. 6 is a part of a perspective view of the first member (cam cover) according to the embodiment of the invention. FIGS. 7 and 8 are schematic sectional views of a mounted state of a first gasket portion of the gasket according to the embodiment of the invention. FIG. 7 is the sectional view taken at a portion indicated by an arrow A in FIG. 2 and FIG. 8 is the sectional view taken at a portion indicated by an arrow B in FIG. 2.

First, with reference to FIGS. 4 to 8 especially, members to be mounted with the gasket 100 will be described. Described as an example in the embodiment is a structure in which the gasket 100 seals a clearance between the cam cover 200 as the first member and a housing 300 as a second member.

A space area in the cam cover 200 is partitioned with a partition wall 220 as shown in FIG. 5, for example. As a result, a first opening portion K1 formed of an end portion (end portion on an opening portion side) of the outer wall portion 210 and a second opening portion K2 formed of a part of the end portion of the outer wall portion 210 and an end portion (end portion on the opening portion side) of the partition wall 220 and provided in an area of the first opening portion K1 are formed. In the embodiment, an outward opening portion of a pipe portion functioning as a blow-by gas pipe corresponds to the second opening portion K2.

In an end portion of the outer wall portion 210, a first groove 211 is formed along an opening end edge of the first opening portion K1. In an end portion of the partition wall 220, second grooves 221 are formed only in areas where the partition wall 220 is connected to the outer wall portion 210. The second grooves 221 have inclined bottom faces 221a extending from a bottom face 211a of the first groove 211 to a surface of the end portion of the partition wall 220. The groove is not formed in the whole end portion of the partition wall 220 because of quality reason related to dimensions and manufacture.

The housing 300 is provided with opposed faces 301 for facing the end portion of the outer wall portion 210 and the end portion of the partition wall 220 of the cam cover 200, respectively. The opposed faces 301 are formed in the same plane. Therefore, a portion of the face facing the end portion of the outer wall portion 210 and a portion of the face facing the end portion of the partition wall 220 are in the same plane.

Next, with reference to FIGS. 1 to 4, 7, and 8 especially, the gasket 100 will be described.

The gasket 100 includes a first gasket portion 110 formed in a shape along the end portion of the outer wall portion of the cam cover 200 and a second gasket portion 120 formed in a shape along the end portion of the partition wall 220 of the cam cover 200. Both ends of the second gasket portion 120 are connected to the first gasket portion 110.

On a face of the gasket 100 opposed to the housing 300, a first seal protruding portion 131, a second seal protruding portion 132, and a third seal protruding portion 133 are provided. With these seal protruding portions, each of the first gasket portion 110 and the second gasket portion 120 is provided with a pair of seal protruding portions for coming in close contact with the opposed face 301 of the housing 300. Here, the first seal protruding portion 131 is provided along the opening end edge of the first opening portion K1. The second seal protruding portion 132 is provided along the end edge of the opening portion of the area of the first opening portion K1 excluding the area of the second opening portion K2. The third seal protruding portion 133 is provided along the opening end edge of the second opening portion K2.

The first gasket portion 110 includes a first mounted portion 111 and jutting portions 115. The first mounted portion 111 is mounted in the first groove 211 formed in the end portion of the outer wall portion 210 of the cam cover 200. The jutting portions 115 are provided to be disposed along the opening end edge of the first groove 211 and jut over both side faces and are sandwiched between the cam cover 200 and the housing 300.

FIGS. 7 and 8 show sections of the mounted state of the first mounted portion 111. As shown in these drawings, a tip end of the first mounted portion 111 comes in close contact with the bottom face 211a of the first groove 211. The pair of seal protruding portions (the first seal protruding portion 131 and the second seal protruding portion 132 in the case shown in these drawings) comes in close contact with the opposed face 301 of the housing 300.

At a plurality of positions of both side faces of the first mounted portion 111, protrusions 140 for preventing coming out are provided. FIG. 7 shows a portion provided with the protrusions 140 for preventing coming out. FIG. 8 shows a portion not provided with the protrusions 140 for preventing coming out. As shown in FIG. 7, the protrusions 140 for preventing coming out come in close contact with side faces of the first groove 211. As a result, the first gasket portion 110 is prevented from coming out of the first groove 211 after mounting of the gasket.

<Second Gasket Portion>

Figure 9:
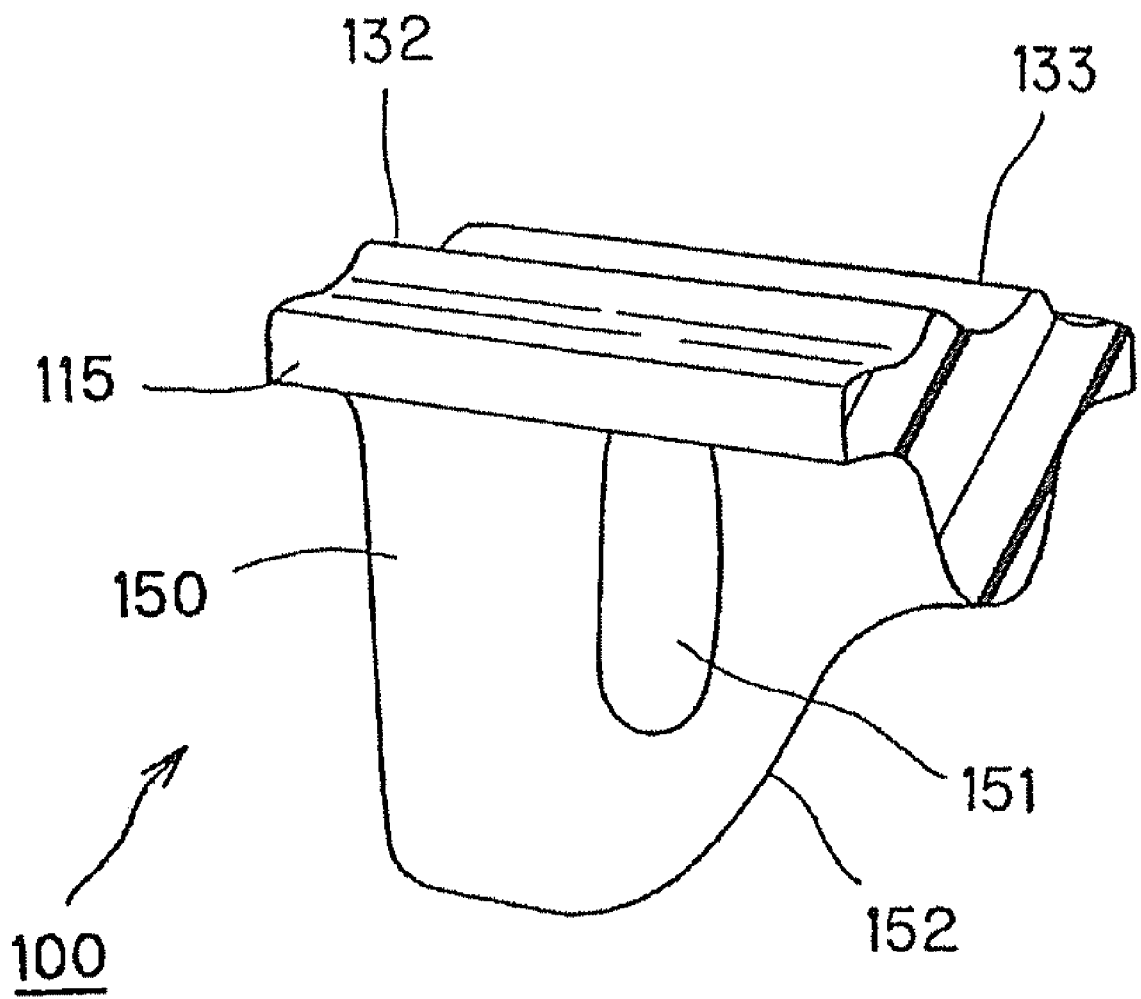
FIG. 9 is a perspective view of an area around a second mounted portion of the gasket according to the embodiment of the invention.
Figure 10:
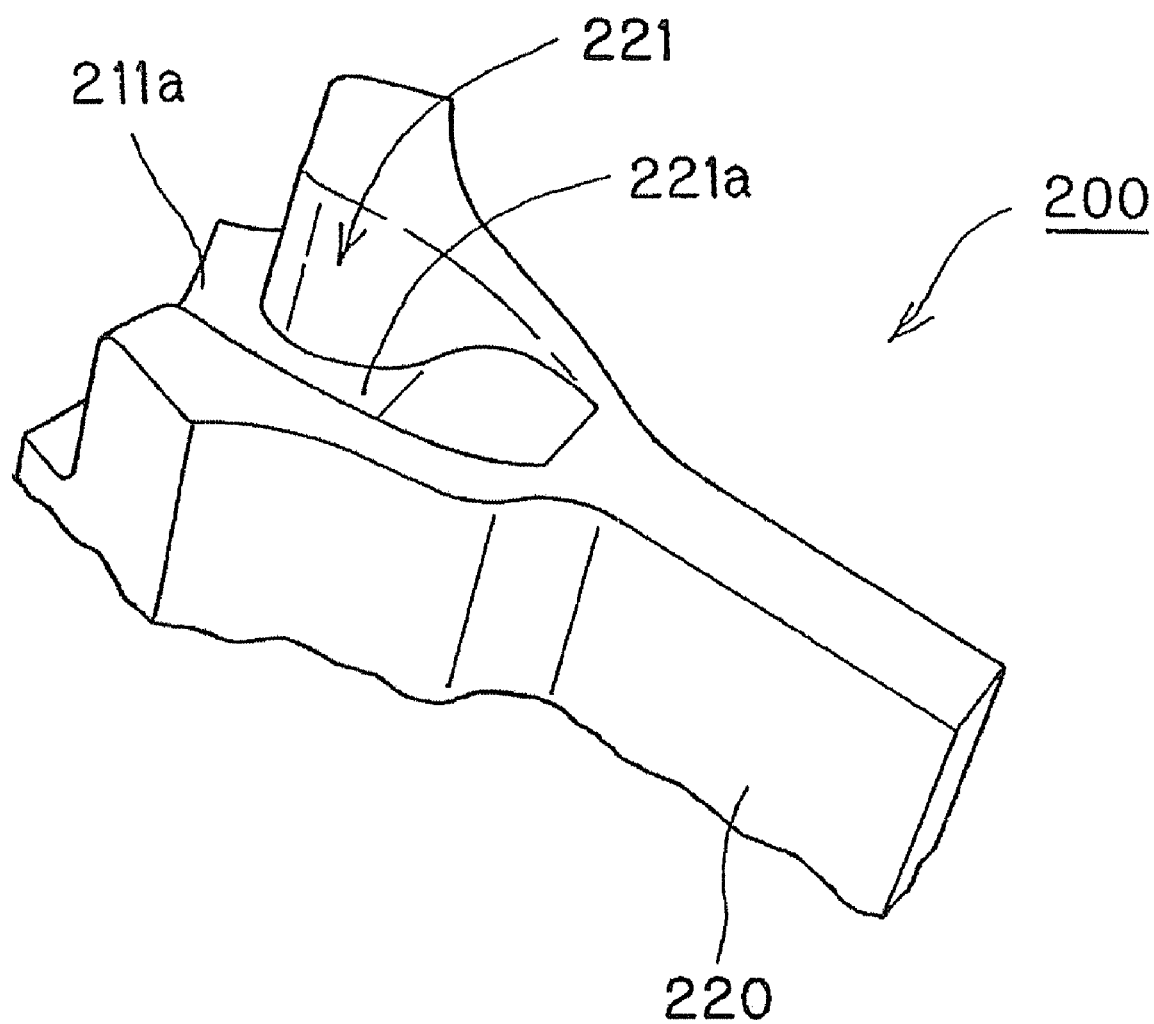
FIG. 10 is a perspective view of an area around a second groove in the first member (cam cover) according to the embodiment of the invention.
Figure 11:
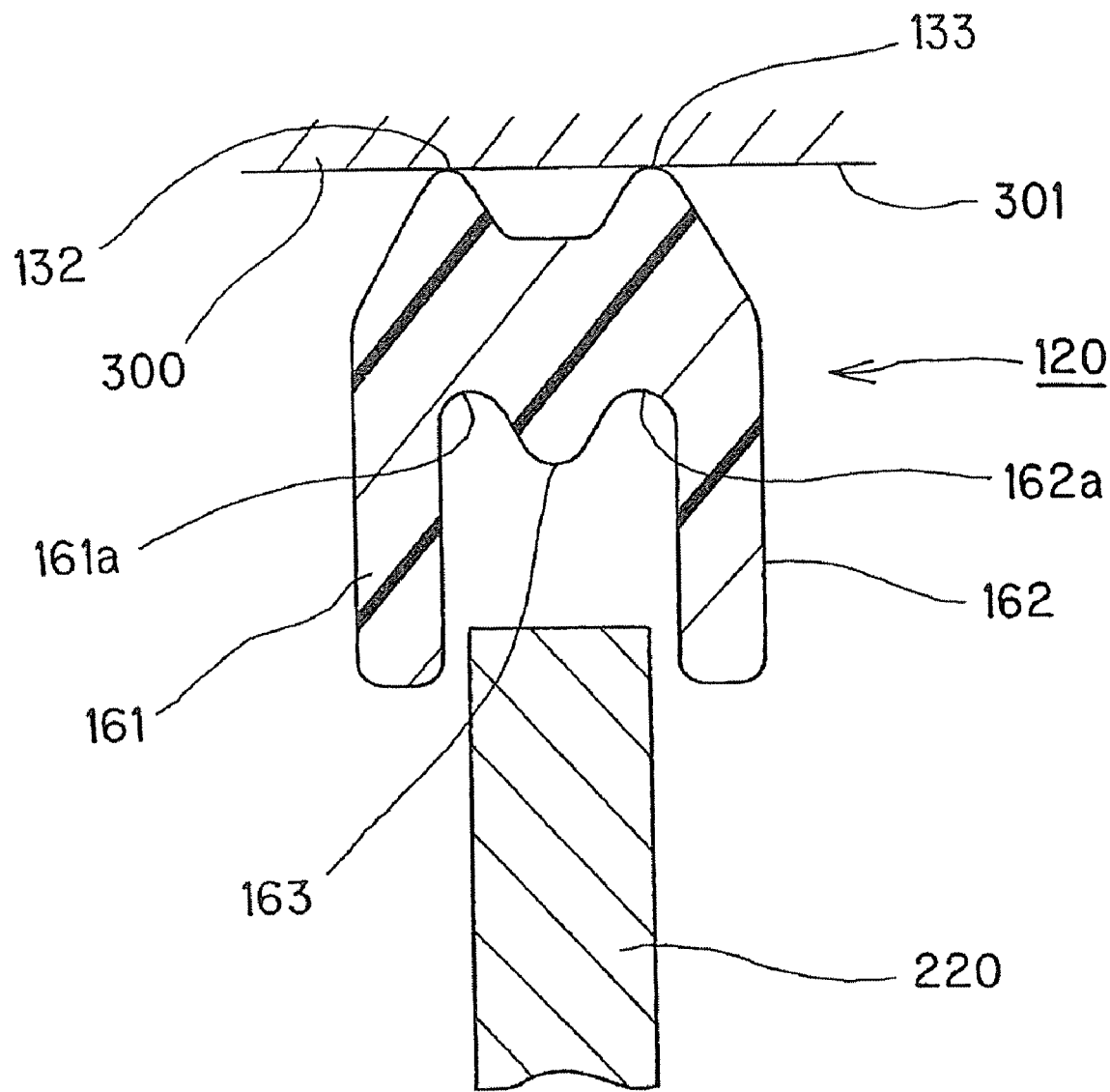
FIG. 11 is a schematic sectional view for explaining a mounted state of a second gasket portion of the gasket according to the embodiment of the invention.
Figure 12:
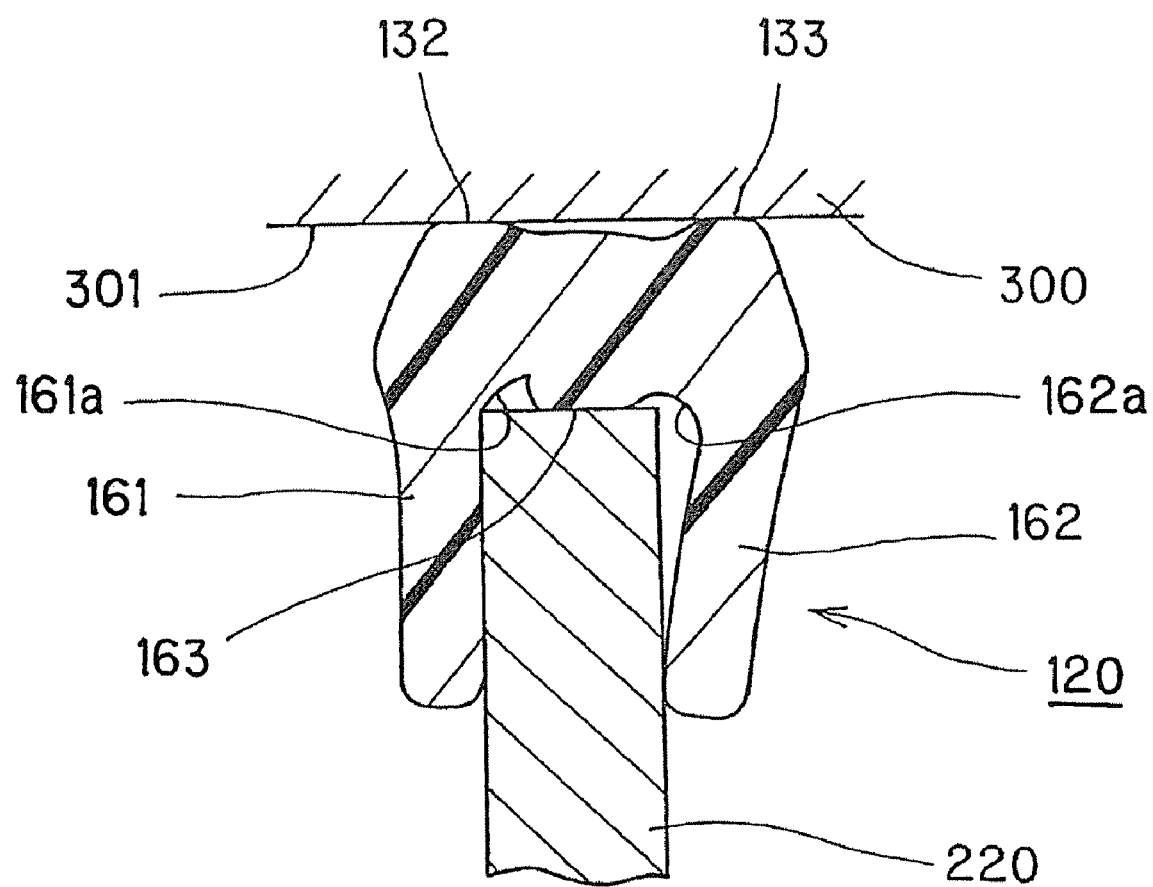
FIG. 12 is a schematic sectional view for explaining the mounted state of the second gasket portion of the gasket according to the embodiment of the invention.
Figure 13:
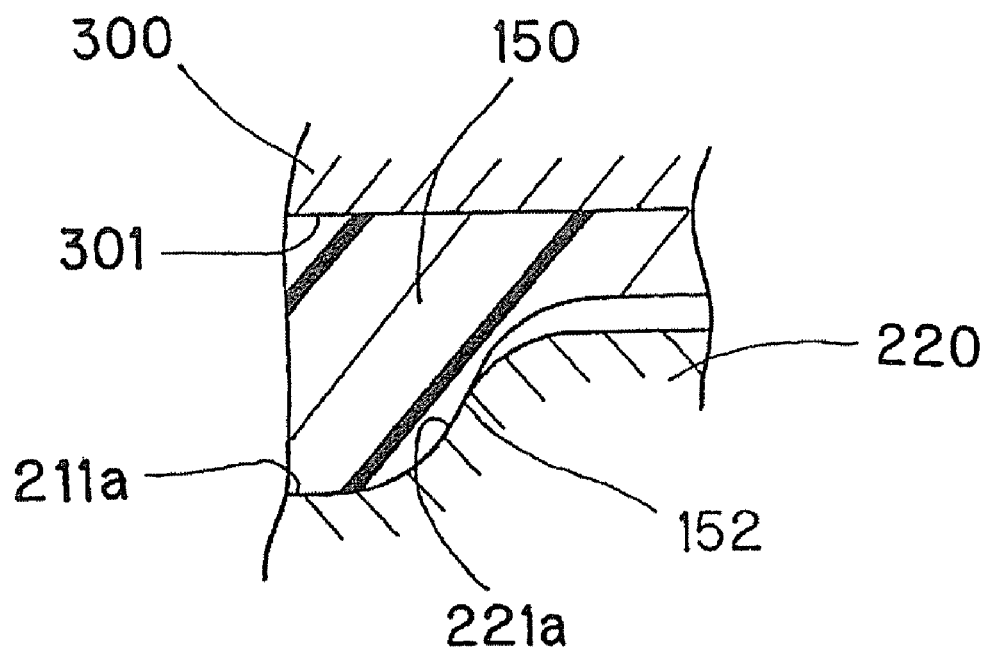
FIG. 13 is a schematic sectional view for explaining a mounted state of a second mounted portion of the gasket according to the embodiment of the invention.
Figure 14:
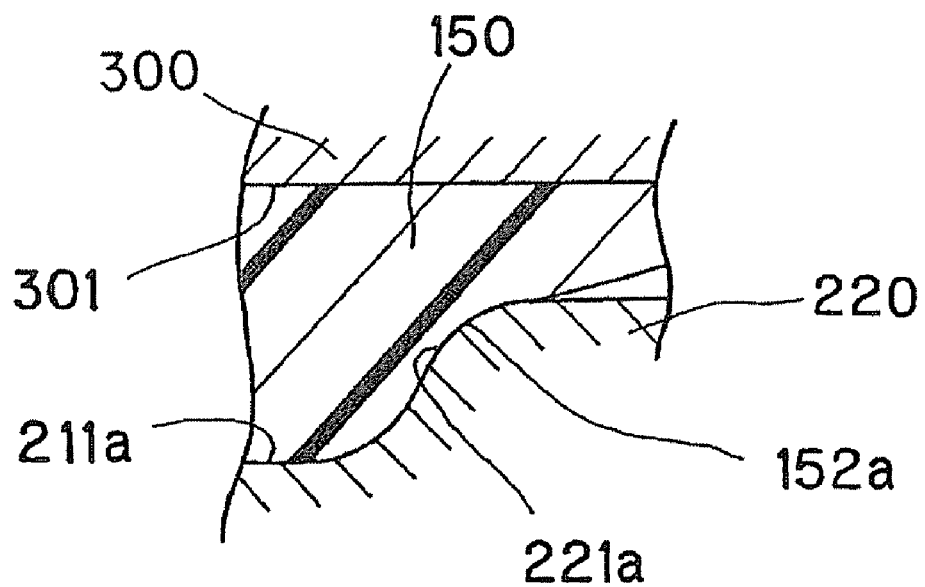
FIG. 14 is a schematic sectional view for explaining a mounted state of a second mounted portion of a gasket according to a comparative example (hypothetical technique).
Figure 15:
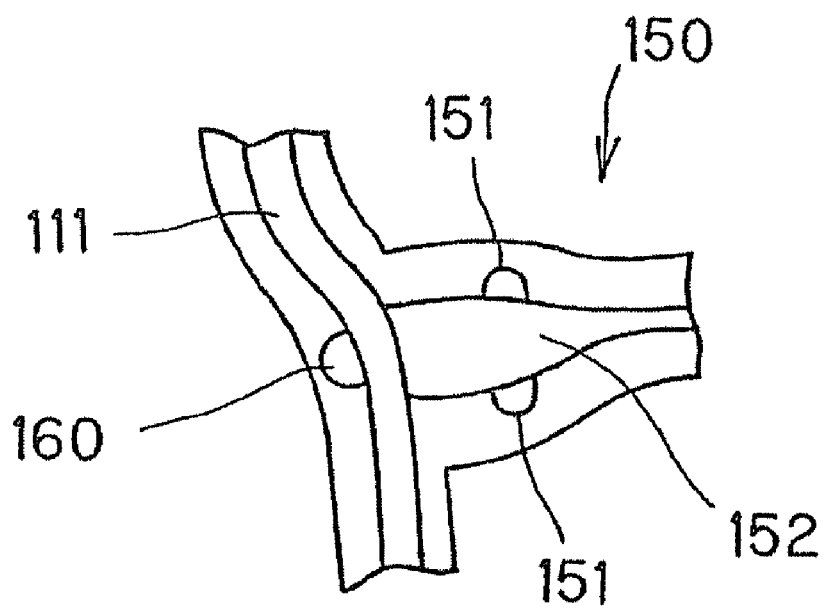
FIG. 15 is a bottom view showing the second mounted portion of the gasket according to the embodiment of the invention.

With reference to FIGS. 9 to 15 especially, the second gasket portion 120 will be described in greater detail. FIG. 9 is a perspective view of an area around a second mounted portion in the gasket according to the embodiment of the invention. FIG. 9 corresponds to a perspective view of an area in a circle C in FIG. 3. FIG. 10 is a perspective view of an area around the second groove in the first member (cam cover) according to the embodiment of the invention. FIGS. 11 and 12 are schematic sectional views for explaining a mounted state of the second gasket portion of the gasket according to the embodiment of the invention. FIG. 11 shows a state immediately before mounting of the housing (before an external force due to the housing acts). FIG. 12 shows the state in which the housing is mounted. Here, the second gasket portion 120 in FIGS. 11 and 12 corresponds to a section of a portion in a circle D in FIG. 3. FIG. 13 is a schematic sectional view for explaining a mounted state of the second mounted portion of the gasket according to the embodiment of the invention. FIG. 14 is a schematic sectional view for explaining a mounted state of a second mounted portion of a gasket according to a comparative example (hypothetical technique). FIG. 15 is a bottom view showing the second mounted portion of the gasket according to the embodiment of the invention.

The second gasket portion 120 includes the second mounted portions 150. The second mounted portions 150 are mounted in the second grooves 221 formed only in the areas where the end portions of the partition wall 220 of the cam cover 200 are connected to the outer wall portion 210. On a bottom face of each of the second mounted portions 150, an inclined face 152 for coming in close contact with the inclined bottom face 221a of the second groove 221 is formed. The second gasket portion 120 excluding the second mounted portions 150 is not mounted in the groove but sandwiched between the surface of the end portion of the partition wall 220 and the opposed face 301 of the housing 300.

First, with reference to FIGS. 11 and 12 especially, the mounted state of the second gasket portion 120 excluding the second mounted portion 150 will be described. FIG. 11 shows a state in which the gasket 100 is mounted on the cam cover 200 immediately before mounting of the housing 300. In other words, FIG. 11 shows a state in which an external force due to the housing 300 is not acting on the gasket 100. As shown in the drawing, the second gasket portion 120 is not in contact with the end portion of the partition wall 220 when the external force due to the housing 300 is not acting.

The second gasket portion 120 includes a seal protrusion 163 and a pair of seal protruding portions (a second seal protruding portion 132 and a third seal protruding portion 133). The seal protrusion 163 comes in close contact with the end portion of the partition wall 220 along the end portion. The pair of seal protruding portions comes in close contact with the opposed face 301 of the housing 300. The pair of seal protruding portions is provided along both sides of the seal protrusion 163 on a face opposite to a face provided with the seal protrusion 163.

The second gasket portion 120 is provided on its both side faces with the pair of guides 161, 162 as positioning portions. These guides 161, 162 extend in the same direction as the seal protrusion 163 and are provided along both side faces of the partition wall 220. Inner corner portions 161a, 162a of the guides 161, 162 are recessed in curved shapes.

The mounted state of the second gasket portion 120, in which the second gasket portion 120 having the above structure is completely mounted (the housing 300 is mounted), will be described with reference to FIG. 12.

In the state in which the second gasket portion 120 is completely mounted, the second gasket portion 120 is sandwiched between the end portion of the partition wall 220 and the opposed face 301 of the housing 300. At this time, a tip end of the seal protrusion 163 comes in close contact with the end portion of the partition wall 220 and the pair of seal protruding portions (the second seal protruding portion 132 and the third seal protruding portion 133) comes in close contact with the opposed face 301 of the housing 300. In this way, the second gasket portion 120 is compressed in a three-point contact state at its three protruding portions. Therefore, it is possible to prevent excessive compression of the second gasket portion 120.

The pair of guides 161, 162 is disposed along the both side faces of the partition wall 220. The pair of guides 161, 162 prevents displacement of the second gasket portion 120 with respect to the partition wall 220. When the second gasket portion 120 is compressed by the end portion of the partition wall 220 and the opposed face 301 of the housing 300, the second gasket portion 120 tries to get deformed to stretch outside the second opening portion K2 of the cam cover 200. As a result, especially the guide 161 facing the second opening portion K2 out of the pair of guides 161, 162 comes in close contact with the side face of the partition wall 220 and prevents the displacement of the second gasket portion 120. Therefore, under normal circumstances, the guide 161 mainly functions as the positioning portion and the guide 162 does not function so much as the positioning portion. Because the inner corner portions 161a, 162a of the guides 161, 162 are recessed in the curved shapes as described above, it is possible to prevent the corner portions 161a, 162a from strongly hitting edge portions of the partition wall 220.

Next, with reference to FIG. 9 and FIGS. 13 to 15 especially, the second mounted portions 150 of the second gasket portion 120 will be described in detail.

The bottom face of each of the second mounted portions 150 of the second gasket portion 120 is provided with the inclined face 152 for coming in close contact with the inclined bottom face 221a of the second groove 221 as described above. The inclined face 152 will be especially described in detail with reference to FIGS. 13 and 14.

In the present embodiment, in the state in which the second mounted portion 150 is mounted in the second groove 221 of the cam cover 200 and the external force due to the housing 300 is not acting, the inclined face 152 is in close contact with the bottom face 211a of the first groove 211 and has a clearance gradually increasing toward the surface of the end portion of the partition wall 220 as shown in FIG. 13. To put it concretely, this clearance is set so that a compression rate becomes uniform throughout the second mounted portion 150 when the second gasket portion 120 is sandwiched between the partition wall 220 and the housing 300 (when the housing 300 is mounted). In this way, it is possible to uniformize surface pressures applied on the surface of the partition wall 220 and on the opposed face 301 of the housing 300 from the second mounted portion 150.

FIG. 14 shows an example as a comparative example (hypothetical technique) in which no clearance exists between the inclined face 152a of the second mounted portion 150 and the inclined bottom face 221a of the second groove 221. In this case, the compression rate of the second mounted portion 150 is nonuniform and the surface pressures applied on the surface of the partition wall 220 and on the opposed face 301 of the housing 300 from the second mounted portion 150 are nonuniform.

In other words, in mounting the housing 300, an amount (dimension) of pushing-in of the second mounted portion 150 by the housing 300 is the same in any position. On the other hand, a wall thickness of the second mounted portion 150 is set to increase toward the first groove 211. Therefore, if there is no clearance between the inclined face 152a of the second mounted portion 150 and the bottom face 221a of the second groove 221 in the state in which the external force due to the housing 300 is not acting and when the second mounted portion 150 is pushed in by the housing 300, the compression rate reduces toward the first groove 211 and becomes more nonuniform.

On the other hand, it is possible to uniformize the compression rate in the embodiment as described above.

Here, when the second mounted portion 150 is compressed by the cam cover 200 and the housing 300, the inclined face 152 of the second mounted portion 150 receives reaction from the inclined bottom face 221a of the second groove 221. This reaction force includes a component force in a direction in which the second mounted portion 150 moves toward the first groove 211. Therefore, if the second mounted portion 150 moves toward the first groove 211, the surface pressure between the inclined face 152 of the second mounted portion 150 and the inclined bottom face 221a of the second groove 221 reduces.

Therefore, in the embodiment, a structure for suppressing displacement of the second mounted portion 150 is employed. In other words, in the embodiment, a pair of first protruding portions 151 for respectively coming in close contact with both side faces of the second groove 221 is provided on both side faces of the second mounted portion 150. At a back side position of a portion of the side face of the first mounted portion 111 connected to the second gasket portion 120 (second mounted portion 150), a second protruding portion 160 for coming in close contact with the side face of the first groove 211 is provided.

The pair of first protruding portions 151 and the second protruding portion 160 suppresses displacement of the second mounted portion 150 in the second groove 221.

<Excellent Points of the Embodiment>

As described above, with the sealing structure and the gasket 100 according to the embodiment, the portion (the whole end portion of the outer wall portion 210) of the cam cover 200 where the first groove 211 is formed can be sealed with the first gasket portion 110 and the portion (most part of the end portion of the partition wall 220) where the groove is not formed can be sealed with the second gasket portion 120.

The second gasket portion 120 is positioned when the second mounted portions 150 provided to portions connected to the first gasket portion 110 are mounted in the second grooves 221.

At portions where the outer wall portion 210 and the partition wall 220 are connected, the second grooves 221 are formed only in areas of the end portion of the partition wall 220 connected to the outer wall portion 210. These portions are sealed when the second mounted portions 150 provided to the second gasket portion 120 are mounted in the second grooves 221. Here, the bottom faces 221a of the second grooves 221 are formed of the inclined faces extending from the bottom face 211a of the first groove 211 to the surface of the end portion of the partition wall 220. The second mounted portions 150 are provided with the inclined faces 152 for coming in close contact with the bottom faces 221a of the second grooves 221. Therefore, sealing performance can be exerted stably at the portions where the outer wall portion 210 and the partition wall 220 are connected.

As described above, according to the embodiment, even if the portion where the groove for mounting the gasket is formed and the portion where the groove for mounting the gasket is not formed are connected, it is possible to appropriately seal both the portions.

In the embodiment, by providing the pair of guides 161, 162 to the second gasket portion 120, it is possible to prevent displacement of the second gasket portion 120 with respect to the partition wall 220 especially with the guide 161. Therefore, it is possible to more stably exert the sealing function.

According to the embodiment, the second gasket portion 120 is compressed in a three-point contact state at the seal protrusion 163 and the pair of seal protruding portions (the second seal protruding portion 132 and the third seal protruding portion 133) on the opposite face. Therefore, it is possible to stabilize the mounted state of the second gasket portion 120 while preventing excessive compression of the second gasket portion 120. As a result, it is possible to more stably exert the sealing function.

In the embodiment, by devising the way of setting the inclined faces of the second mounted portion 150, the compression rate becomes uniform throughout the second mounted portion 150. Therefore, it is possible to uniformize the surface pressures applied on the surface of the partition wall 220 and on the opposed face 301 of the housing 300 from the second mounted portion 150. As a result, it is possible to more stably exert the sealing performance.

In the embodiment, with the pair of first protruding portions 151 provided to the both side faces of the second mounted portion 150 and the second protruding portion 160 provided in the back side position of the portion of the side face of the first mounted portion 111 connected to the second gasket portion 120, it is possible to stabilize the mounted state of the second mounted portion 150 in the second groove 221. Therefore, it is possible to more stably exert the sealing performance.

In the embodiment, the seal protruding portions provided to the first gasket portion 110 and the second gasket portion 120 are formed of the first seal protruding portion 131 provided along the opening end edge of the first opening portion K1, the second seal protruding portion 132 provided along the end edge of the opening portion of the area of the first opening portion K1 excluding the area of the second opening portion K2, and the third seal protruding portion 133 provided along the opening end edge of the second opening portion K2. The first seal protruding portion 131, the second seal protruding portion 132, and the third seal protruding portion 133 are provided separately from each other without being connected to each other. Therefore, even if the respective seal protruding portions receive forces from the opposed face 301 of the housing 300, it is possible to suppress concentration of stress on particular portions, because the first seal protruding portion 131, the second seal protruding portion 132, and the third seal protruding portion 133 are not connected to each other.

<Others>

Figure 16:
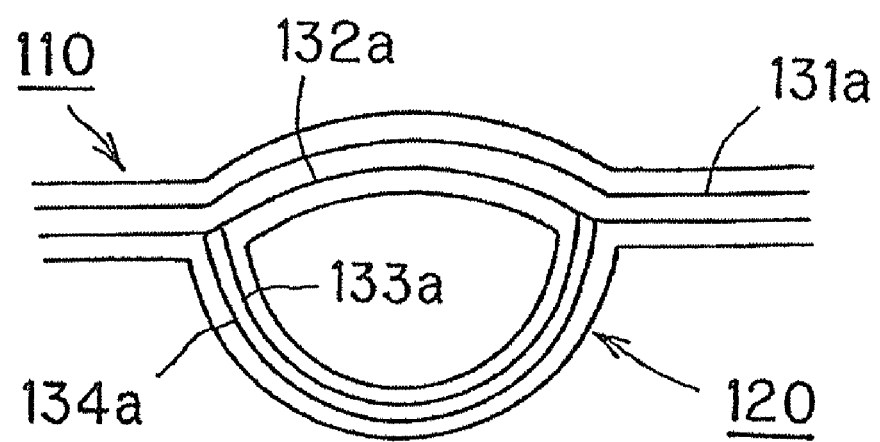
FIG. 16 is a part of a plan view of a gasket and showing a modification of seal protruding portions in the gasket according to the embodiment of the invention.

In the embodiment, the first seal protruding portion 131, the second seal protruding portion 132, and the third seal protruding portion 133 are not connected each other in order to suppress the concentration of the stress. However, if the concentration of the stress is unlikely to occur or if the concentration of the stress does not seriously affect the sealing function, the seal protruding portions may be connected to each other. Such an example will be described with reference to FIG. 16. FIG. 16 is a part of a plan view of a gasket and showing a modification of the seal protruding portions in the gasket according to the embodiment of the invention.

As shown in the drawing, in this modification, the first gasket portion 110 is provided with a pair of seal protruding portions 131a, 132a and the second gasket portion 120 is provided with a pair of seal protruding portions 133a, 134a. In this way, similarly to the above embodiment, each of the first gasket portion 110 and the second gasket portion 120 is provided with the pair of seal protruding portions.

Here, in the modification, the pair of seal protruding portions 133a, 134a provided to the second gasket portion 120 is provided to branch out from the seal protruding portion 132a provided to the first gasket portion 110.

If the seal protruding portions are provided to branch in this manner, stress is likely to concentrate on the branch points when the seal protruding portions are compressed. Therefore, if there is a possibility that the concentration of the stress occurs to impair the sealing function, it is preferable not to employ the structure in this modification but to employ the structure shown in the above embodiment.

The invention claimed is:

1. A sealing structure comprising:
a first member including an inner space area partitioned with a partition wall and having a first opening portion formed by an end portion of an outer wall portion and a second opening portion formed by part of the end portion of the outer wall portion and an end portion of the partition wall and provided in an area of the first opening portion;
a second member having an opposed face facing the end portion of the outer wall portion and the end portion of the partition wall; and
a gasket mounted along the end portion of the outer wall portion and the end portion of the partition wall to seal a clearance between the respective end portions of the outer wall portion and the partition wall and the opposed face of the second member,
wherein a first groove provided along an opening end edge of the first opening portion is formed in the end portion of the outer wall portion,
a second groove having an inclined bottom face extending from a bottom face of the first groove to a surface of the end portion of the partition wall is formed only at a portion of the end portion of the partition wall connected to the outer wall portion, and
the gasket includes
a first gasket portion which has a first mounted portion to be mounted in the first groove to come in contact with the bottom face of the first groove and which is formed in a shape along the end portion of the outer wall portion and
a second gasket portion which has a second mounted portion to be mounted in the second groove near a portion connected to the first gasket portion and which is formed in a shape along the end portion of the partition wall, the second mounted portion having an inclined face for coming in contact with the inclined bottom face of the second groove.

2. The sealing structure according to claim 1, wherein said second gasket portion includes a seal protrusion extending from said second mounted portion and a pair of guides disposed on opposite sides of said seal protrusion for receiving a portion of the partition wall therebetween and in contact with said seal protrusion.

3. A sealing assembly comprising: a gasket sandwiched between a first member and a second member to seal a clearance between the first member and the second member,
wherein the first member includes an inner space area partitioned with a partition wall and has a first opening portion formed of an end portion of an outer wall portion and a second opening portion formed of part of the end portion of the outer wall portion and an end portion of the partition wall and provided in an area of the first opening portion, a first groove provided along an opening end edge of the first opening portion is formed in the end portion of the outer wall portion, a second groove having an inclined bottom face extending from a bottom face of the first groove to a surface of the end portion of the partition wall is formed only at a portion of the end portion of the partition wall connected to the outer wall portion,
a second member has an opposed face facing the end portion of the outer wall portion and the end portion of the partition wall, and
the gasket includes
a first gasket portion which has a first mounted portion to be mounted in the first groove to come in contact with the bottom face of the first groove and which is formed in a shape along the end portion of the outer wall portion and
a second gasket portion which has a second mounted portion to be mounted in the second groove near a portion connected to the first gasket portion and which is formed in a shape along the end portion of the partition wall, the second mounted portion having an inclined face for coming in contact with the inclined bottom face of the second groove.

4. The sealing assembly according to claim 3, wherein the second gasket portion has a positioning portion for coming in contact with a side face of the partition wall to be positioned with respect to the partition wall.

5. The sealing assembly according to claim 3,
wherein the second gasket portion has
a seal protrusion for coming in contact with the end portion of the partition wall along the end portion and
a pair of seal protruding portions provided along both sides of the seal protrusion on an opposite face to the seal protrusion to come in contact with the opposed face of the second member.

6. The sealing assembly according to claim 3,
wherein the inclined face of the second mounted portion is set
so that a compression rate becomes uniform throughout the second mounted portion when the second gasket portion is sandwiched between the first member and the second member and
that, when the second mounted portion is mounted in the second groove of the first member and an external force due to the second member is not acting on the second mounted portion, the second mounted portion is in contact on a side of the bottom face of the first groove and has a clearance gradually increasing toward the surface of the end portion of the partition wall.

7. The sealing assembly according to claim 3, wherein a pair of first protruding portions for respectively coming in contact with both side faces of the second groove is provided on both side faces of the second mounted portion.

8. The sealing assembly according to claim 3, wherein a second protruding portion for coming in contact with a side face of the first groove is provided in a position of a side face of the first mounted portion opposite to a portion connected to the second gasket portion.

9. The sealing assembly according to claim 3,
wherein each of the first gasket portion and the second gasket portion is provided with a pair of seal protruding portions for coming in contact with the opposed face of the second member,
the seal protruding portions are formed of
a first seal protruding portion provided along the opening end edge of the first opening portion, a second seal protruding portion provided along the end edge of the first opening portion excluding an area of the second opening portion, and a third seal protruding portion provided along an opening end edge of the second opening portion, and
the first seal protruding portion, the second seal protruding portion, and the third seal protruding portion are separate from each other.

10. The sealing assembly according to claim 3, wherein said second gasket portion includes a seal protrusion extending from said second mounted portion and a pair of guides disposed on opposite sides of said seal protrusion for receiving a portion of the partition wall therebetween and in contact with said seal protrusion.

* * * * *